United States Patent [19]

Warner

[11] Patent Number: 4,652,082
[45] Date of Patent: Mar. 24, 1987

[54] ANGLED ELECTRO OPTIC CONNECTOR

[75] Inventor: Gary N. Warner, Harrisburg, Pa.

[73] Assignee: AMP Incorporated, Harrisburg, Pa.

[21] Appl. No.: 665,430

[22] Filed: Oct. 29, 1984

[51] Int. Cl.$^4$ .......................... G02B 6/36; G02B 7/26
[52] U.S. Cl. .................................. 350/96.20; 350/96.21
[58] Field of Search ........................... 350/96.20, 96.21

[56] References Cited

U.S. PATENT DOCUMENTS 4,240,695 12/1980 Evans ................................ 350/96.20
4,447,121 5/1984 Cooper et al. .................... 350/96.20
4,547,039 10/1985 Caron et al. ..................... 350/96.20

Primary Examiner—Robert E. Wise

[57] ABSTRACT

A connector for forming sharp angle termination of an optical fiber cable is formed by a pair of mirror image members which together define a profiled fiber channel having a small radius of curvature. A fiber is prepared by stripping the buffer from the free end and placing it in the channel of one member. The other member is placed thereon and secured thereto. The outer profile of the connector can have any configuration and need only enclose the fiber channel.

3 Claims, 4 Drawing Figures

ANGLED ELECTRO OPTIC CONNECTOR

The present invention is directed to an electro optic fiber connector and in particular to one in which a sharply angled interconnect may be effected.

There are many commercially available electro optic fiber connectors. However, these are generally directed towards connectors which except the fibers axially of the cable. This is generally necessary in order to feed the fiber through the connector to a mating face. Heretofor it has not been possible to make an electro optic connector which will accept a fiber in a sharply angled turn.

The present invention facilitates a short sharp turn termination of an optical fiber by providing a pair of mirror image members having a cable receiving end and a mating end at sharply angled relative positions and interconnected by a fiber receiving groove sized to receive a fiber with and without a buffer. The molded members are fixed together about the fiber by chemical, mechanical, thermal or other known bonding means in a precision holding fixture giving a sharply angled termination of the optical fiber cable. The terminated cable is then prepared and polished at the mating end in a known fashion.

The present invention will now be described by way of example with reference to the accompanying drawings in which:

FIG. 3 is an exploded perspective view of the subject invention as it would be utilized in a mating sensor or the like.

Figure 1:
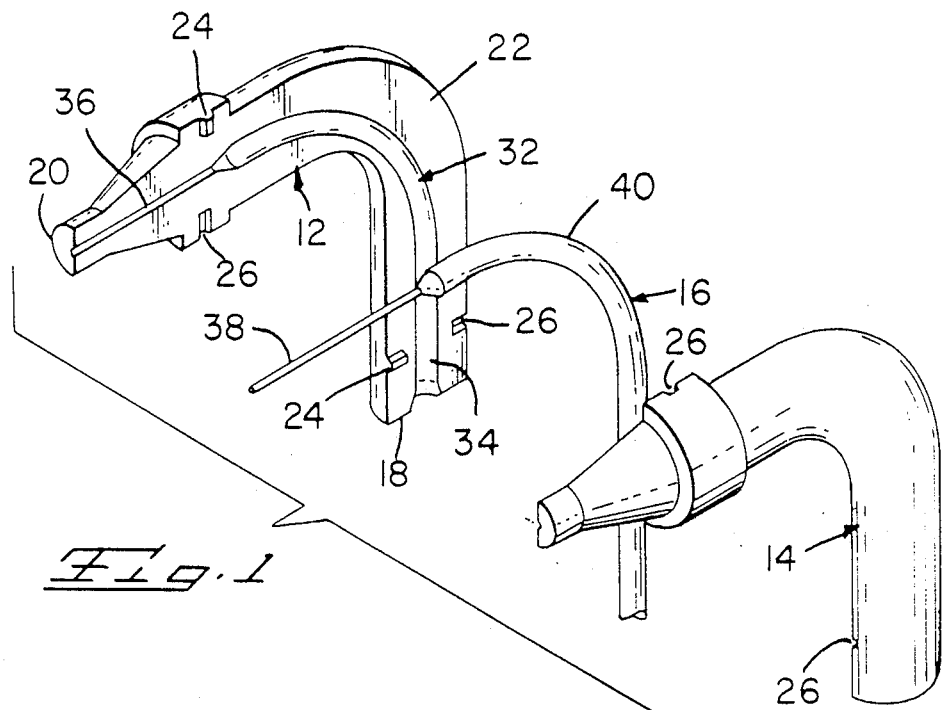
FIG. 1 is an exploded perspective view of the subject connector and an optical fiber.
Figure 2:
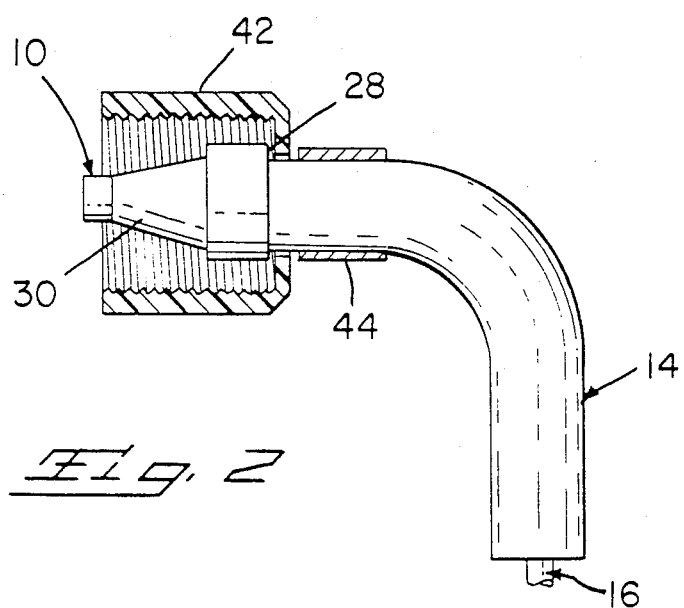
FIG. 2 is a side elevation, partially in section, of the assembled connector of FIG. 1.

The subject connector 10 is formed by a pair of mirror image members 12, 14 which are used to terminate an optical fiber cable 16. Each member 12, 14 has a cable entry end 18 and a mating end 20 and is provided along a mating surface 22 with alignment projections 24 and recesses 26. The exterior of each member, towards the mating end 20, is profiled to form a shoulder 28 and a lead-in nose 30. The mating surfaces 22 of each member 12, 14 are provided with a continuous channel 32 having a first portion 34 leading from the cable entry end 18 and of a first diameter and a second portion 36 leading to the mating end 20 and having a smaller second diameter. The members 12, 14 can be molded from any suitable plastics material.

The optical fiber cable 16 is of a known variety having an optical fiber 38 enclosed within a buffer 40.

In practice the invention is utilized by forming the mating members 12, 14 and placing the cable 16, with the buffer 40 stripped from the end of the fiber 38, in the channel 32. The buffer 40 of the fiber cable 16 is received in the first portion 34 of channel 32 while the fiber 38 is received in the second portion 36. The members 12, 14 are secured together by any of the well-known means such as chemical, mechanical or thermal bonding. The connector 10 can be provided with an internally threaded securing cap 42 held in place by a crimp metal ring 44. Both the cap 42 and ring 44 would be applied to the cable 16 prior to attaching the connector 10.

Figure 3:
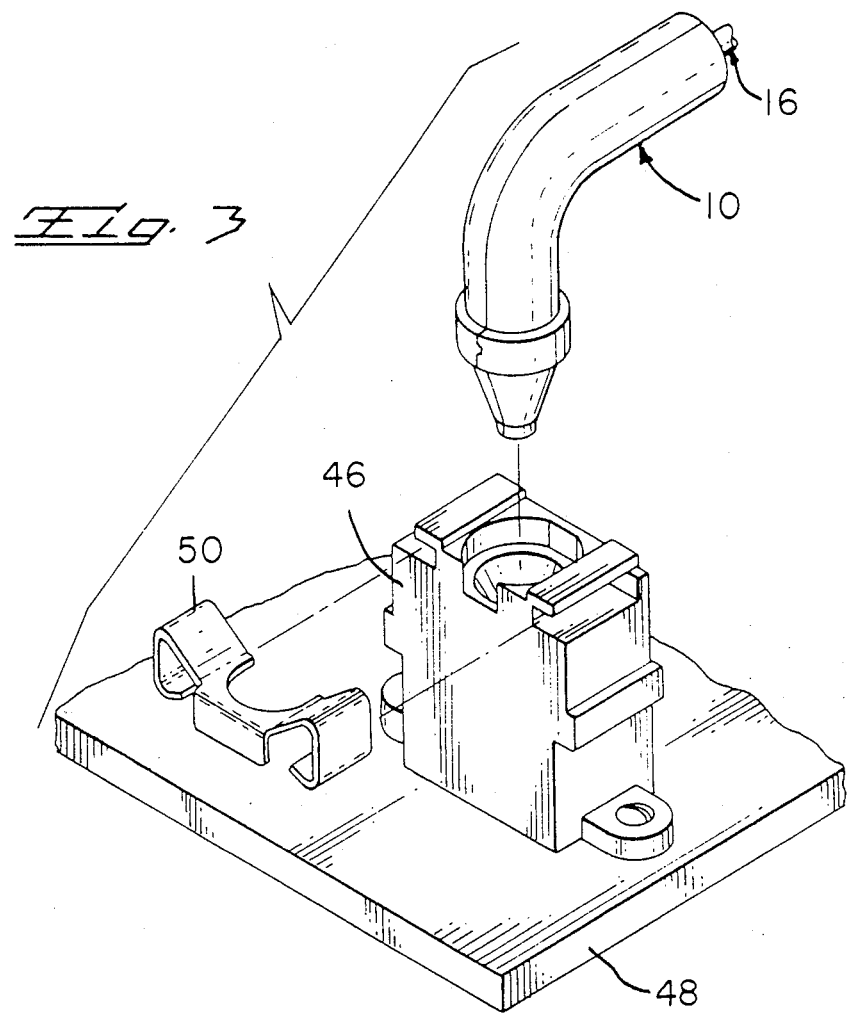
Figure 4:
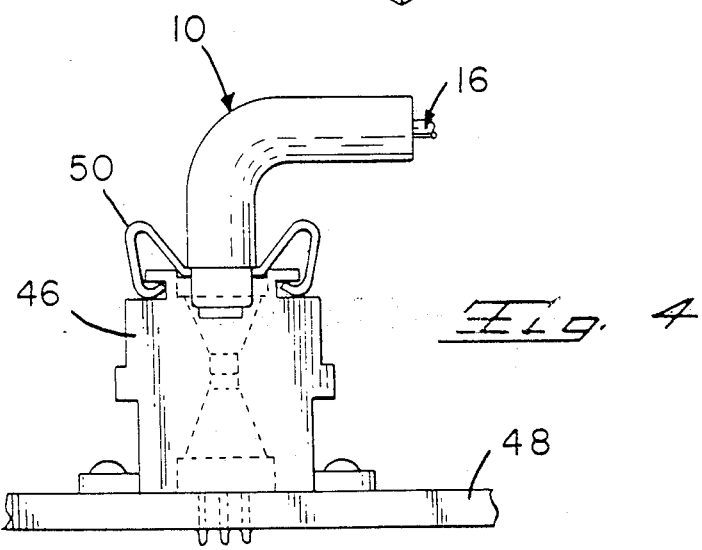
FIG. 4 is a side elevation of the assembly of FIG. 3.

FIGS. 3 and 4 show an application of the present invention to an optical device 46 and the low profile achieved thereby. The device 46 is mounted on a circuit board 48 and the connector 10 is held therein by means of spring clip 50.

The present invention has been shown as a generally right angle embodiment with a fiber channel following a curve of greater radius than the connector members so that the channel is not always exactly centered in the connector. The reason for this is there is a limit to the minimum radius for bending the currently available optical fibers. Thus the connector must provide a fiber channel which approaches the minimum radius while the outside configuration of the connector need only contain the fiber channel. The subject connector therefor could, in addition to what has been shown, either have a radius substantially the same as the fiber channel or have a radially inwardly directed enlargement to accommodate the fiber channel. The present invention can also be formed to accommodate angular orientation other than the right angle shown.

I claim:

1. In a connector for an optical fiber cable including a member having a body, in turn, having opposed aligned interconnecting channels in respective surfaces of opposed halves of said body, an optical fiber cable entering a first end of the body and projecting into the aligned channels, an optical fiber of the cable projecting from the cable and encircled by a second end of the body, the cable having a curved portion, the improvement comprising, the body containing the curved portion of the cable and being directed along a first axis having an angular path, and the aligned channels being curved about a second axis having a radius of curvature greater than that of the angular path of the first axis to limit the radius of bending of the optical fiber therein.

2. A connector for an optical fiber cable as recited in claim 1, wherein, the improvement further comprises, the body provided with a shoulder and an internally threaded cap for movement along the cable and against the shoulder.

3. A connector for an optical fiber cable as recited in claim 1, wherein, the improvement futher comprises, the second end of the body angularly offset from the first end of the body, and the first axis curved intermediate the first end and the second end of the body.

* * * * *